United States Patent [19]

Stevens

[11] Patent Number: 5,713,134
[45] Date of Patent: Feb. 3, 1998

[54] PRECISION ANGLE CUTTING ATTACHMENT FOR CHAIN SAWS

[76] Inventor: Patrick Lane Stevens, 26187 Camas Dr., Hemet, Calif. 92544

[21] Appl. No.: 433,941

[22] Filed: May 2, 1995

[51] Int. Cl.[6] ............................................. B27B 17/00
[52] U.S. Cl. .............................. 30/376; 30/381; 33/465; 83/745
[58] Field of Search ..................... 83/522.18, 522.25, 83/574, 581, 745; 30/372, 374, 375, 376, 381–387, 371, 373; 33/465, 471, 481, 630, 640

[56] References Cited

U.S. PATENT DOCUMENTS

| | | | |
|---|---|---|---|
| 2,735,455 | 2/1956 | Forsberg | 83/745 |
| 3,543,816 | 12/1970 | Thomas | 30/372 |
| 3,845,556 | 11/1974 | Edmunson | 30/381 |
| 4,208,937 | 6/1980 | Marshall | 83/574 X |
| 4,335,512 | 6/1982 | Sheps et al. | 83/745 X |
| 4,685,369 | 8/1987 | Beamer | 83/522.25 X |
| 4,858,318 | 8/1989 | Anderson | 30/383 X |
| 4,901,444 | 2/1990 | Maschmeier | 33/465 X |
| 4,937,943 | 7/1990 | Nieminen | 30/376 |

Primary Examiner—Eugenia Jones
Attorney, Agent, or Firm—Gene Scott-Patent Law & Venture Group

[57] ABSTRACT

An attachment for a chain saw that allows the angle of a cut to be controlled with great precision. The attachment consists of a rigid, rectangular guide frame with an open window construction. An approximately U-shaped blade mount is hingably attached to the guide frame, thus allowing a saw blade to be inserted through the open window of the guide frame and mounted onto the blade mount. The blade mount, and thus the attached saw blade, can move in an arc with respect to the guide frame, and the attachment includes a selecting means by which to determine the angle between the blade mount and the guide frame and a tightening means by which to secure the blade mount and guide frame in the desired position. An additional feature is a directing fence so as to control the direction of a cut. The fence consists of a first and a second bar that are hingably mounted to one another and can thus be rotated and secured so that any desired angle is set between them. The fence is positioned on an edge of the workpiece so that one of the bars rests along the top edge, and the other bar extends along the side edge at the selected angle. The guide frame is then aligned with the angled bar and kept in sliding contact with it as the chain saw blade cuts through the workpiece.

9 Claims, 4 Drawing Sheets

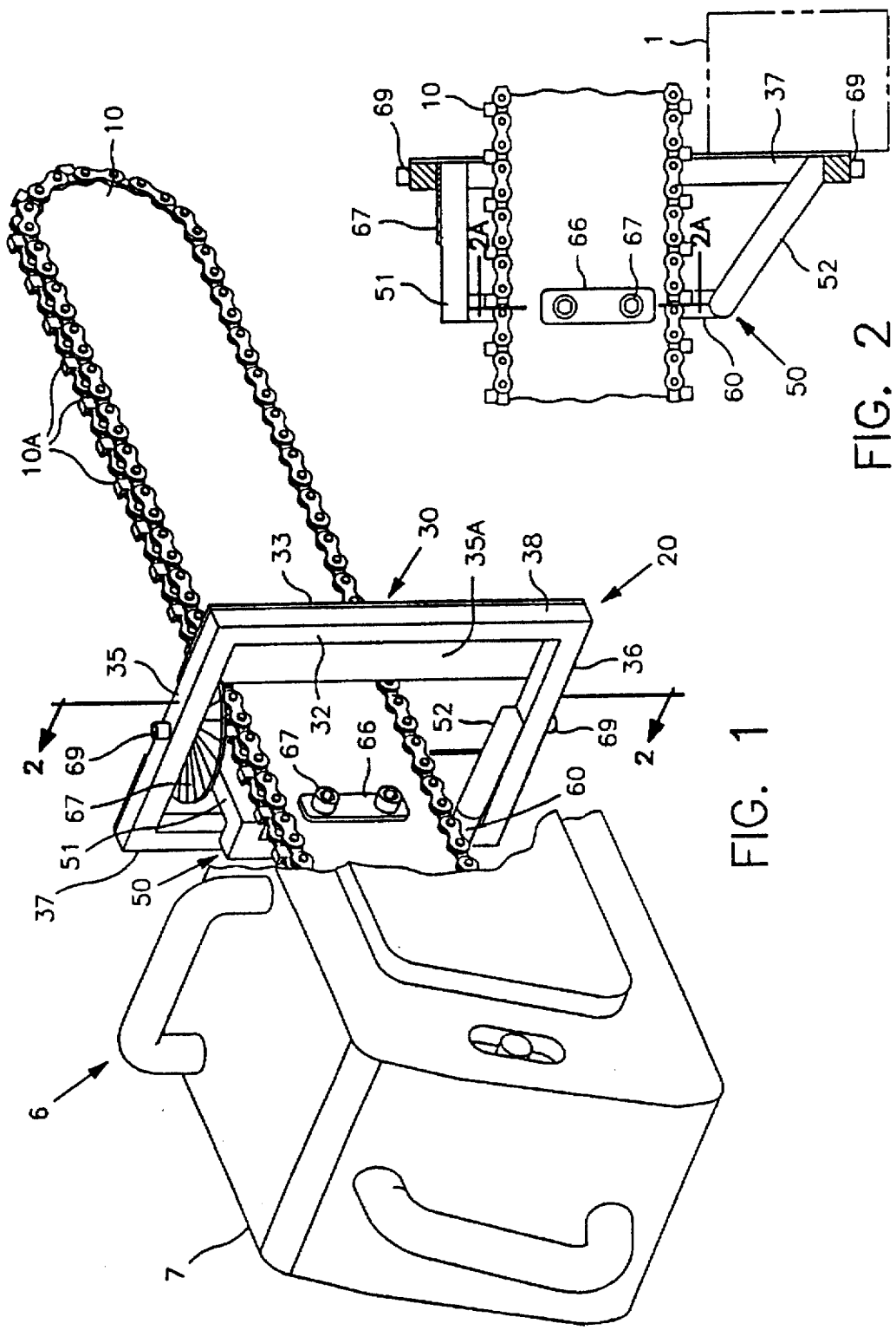

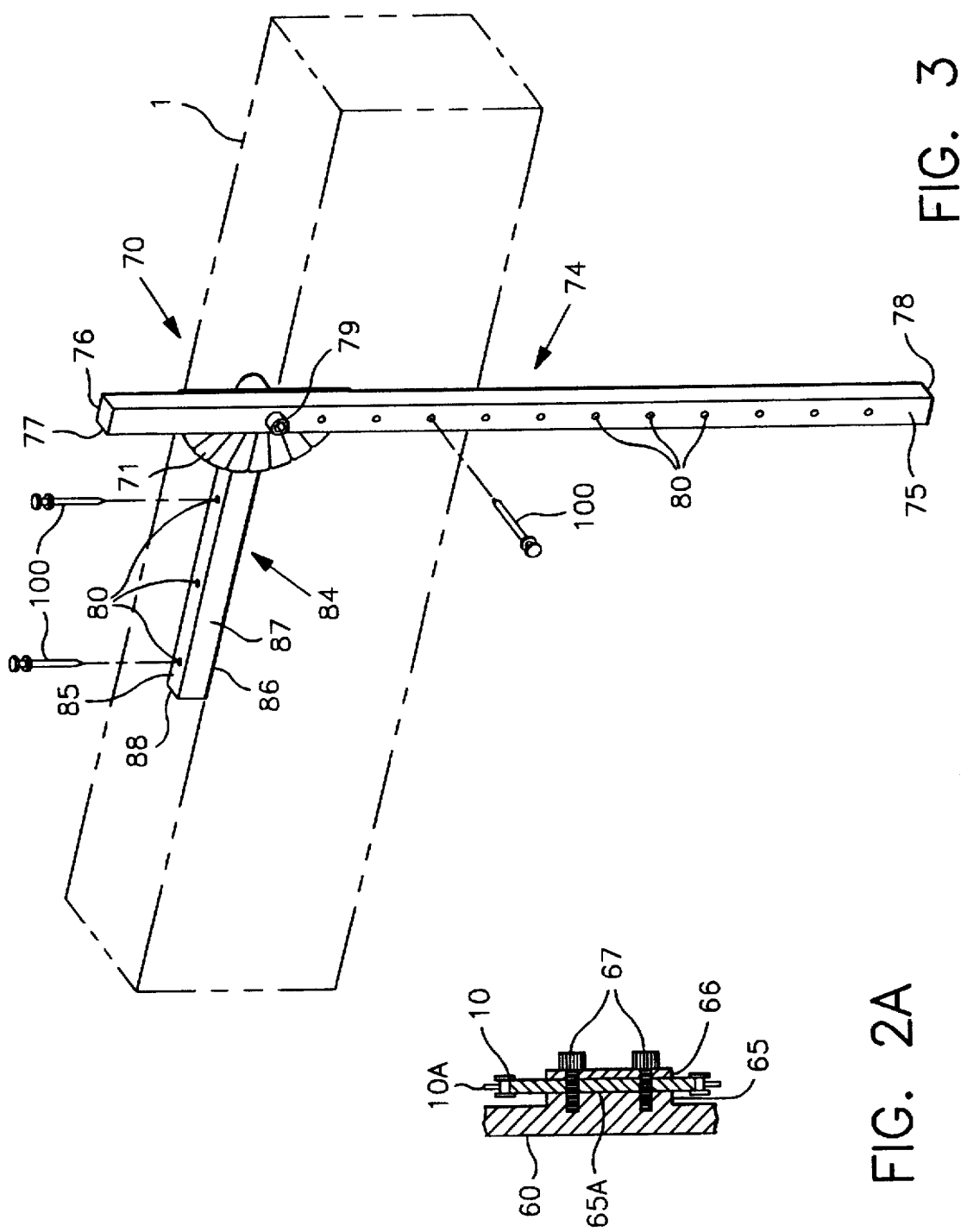

PRECISION ANGLE CUTTING ATTACHMENT FOR CHAIN SAWS

BACKGROUND OF THE INVENTION

1. Field of the Invention

This invention relates generally to equipment for guiding power equipment such as hand tools and more particularly to a combination angle guide and directing fence that enables precision cuts to be made with a chain saw in a wide range of timbers and finished wood shapes.

2. Description of Related Art

Invention and use of cutting guides is known to the public, as they are integral features of many well known types of saws, such as the saber saw and the circular saw. Circular saws are designed with a horizontally disposed rectangular guide plate with a flat bottom surface designed to rest in surface-to-surface contact with the workpiece. The guide plate has a rectangular slit that allows a circular saw blade to be vertically positioned within it. The blade is positioned within the guide so that it extends above and below the guide plate and can freely rotate without contacting the plate. Both the blade and the guide plate are attached to a motor housing. The motor housing provides a handle by which to grasp and manipulate the saw. Saber saws have roughly the same guide plate and blade configuration, except that the blade is usually rectangular and caused to move with reciprocating motion through the workpiece.

Thus, to use such saws, the front edge of the flat guide plate is placed on the workpiece surface with the downwardly extending portion of the saw blade contacting the edge of the workpiece. When the power is turned on and the blade begins to rotate, the handle is used to push the guide plate forward across the workpiece surface while the blade cuts through it. The guide can be positioned and secured at several different angles to the blade, for example 45 degrees, so that when the guide plate is placed flatly against the workpiece surface, the blade is positioned at a 45 degree angle to the workpiece, thereby cutting through it at the selected angle. Obviously, this is an extremely valuable feature, as it allows workpiece to be cut at an angle with a much greater precision than otherwise possible.

Precise angled cutting is particularly essential in building construction, as for example ceiling support joists must be cut to correspond exactly with the slope of a roof and beams must be mitered accurately in order to form sustainable miter joints. Unfortunately, the saws that have this guide plate/blade configuration, like the saber and circular saws, are not ideal for such uses. A main disadvantage of these saws is that they are electrically powered, and thus require a nearby power source for operation, which is not always possible at remote construction sites. In addition, such saws are not particularly designed to cut through beams, and are completely unable to cut through large pieces of timber.

Chain saws, on the other hand, are designed to cut through beams much more efficiently, and many of them are gas-powered, giving them significantly greater range and mobility. However, chain saws do not have the guide plate structure described above, and are therefore clumsy and inaccurate when used for angled cutting.

Obviously then, there is a significant need for a guide that can be easily attached to standard chain saws so as to allow a workpiece to be efficiently cut a precise angle. The present invention fulfills these needs and provides further related advantages as described in the following summary.

SUMMARY OF THE INVENTION

The present invention is an angle guide that is easily attached to the blade of a chain saw so as to enables the saw to cut a workpiece at an angle with greatly improved precision.

The angle guide consists of a rigid, rectangular guide frame with a top, bottom, left and right frame leg arranged so as to form a rectangular open window in the center of the guide frame. A U-shaped blade mount is rotatably attached to the guide frame, extending upwardly from the top and bottom frame legs. The length of the guide frame and blade mount is such that a vertically oriented chain saw blade can be easily slid through the open window and the blade bolted to the blade mount near a motor housing of the chain saw. The blade mount has a slight step configuration, so that when the blade is bolted to one side of it, the blade is actually centered within the blade mount.

Since the blade mount is rotatably mounted to the guide frame, the blade mount and attached chain saw blade can freely rotate in an approximately 180 degree arc with respect to the guide frame. A selecting means is integral with the guide frame at the point where the blade mount is attaches to the top frame leg. The selecting means, preferably a disk shaped graduated sector, enables the user to determine the exact angular position of the chain saw blade and blade mount in relation to the guide frame This is accomplished because the graduated sector preferably a has a series of notches along its outer edge that represent common angles, such as 45, 90 and 135 degrees. A small mark is included on the blade mount so that when it is necessary to cut the workpiece at a particular angle, as for example a 45 degree angle when mitering, the blade mount and attached saw blade are simply rotated until the mark on the blade mount is aligned with the 45 degree notch on the selecting means. A screw head extends from each side of the base plate so that the attachment bar can be secured at a desired angular position. A tightening means, preferably a screw, extends from each side of the guide frame so that the blade mount can be secured at the desired angular position.

The invention also includes a directing fence for further control of the chain saw blade. The fence consists of two bars mounted together so that, like the guide frame and blade mount, they are rotatable in relationship to each other. A selecting means is also provided at the pivot point of the two bars to indicate the exact angle between the bars, and a tightening means is provided for securing them at the desired angle. The directing fence is used at the corner of a workpiece, the shorter of the two bars resting on the top surface edge of the workpiece and the longer of the two bars extending downwardly alongside it at the selected angle. The longer bar includes a series of small clearance holes through which nails can be used to secure the tool in position against the workpiece.

Thus, in use, the present invention can be used in several ways. The directing fence can be positioned on the workpiece at the desired angle while the chain saw and guide frame are tightened so that they are perpendicular to one another. The left or right frame leg of the guide frame is then aligned with the longer fence bar. As the saw blade begins to cut through the workpiece, the guide frame is continually moved along the fence bar, which in turn moves the blade through the workpiece 1 at the desired angle. Thus it is an object of the invention to provide a tool that enables a chain saw to effectively, easily and accurately control the direction of cut of a standard chain saw. This has numerous practical applications, and is particularly useful in mitering a workpiece.

The invention can also be used so that the bars of the directing fence are perpendicular to one another while the blade mount and saw blade are secured at a 45 degree angle to the guide frame. Again, the left or right frame leg is aligned with the longer fence bar and moved gradually along its length as the blade cuts through the workpiece. Thus, it is another object of the invention to provide a tool that enables a standard chain saw to easily control the angle of a cut with great precision. This is particularly useful in creating chamfered corners and the like.

Still further, the invention can be used to create compound angular cuts. This is accomplished simply by securing the directing fence bars with a desired angle between them, and also securing the blade mount and saw blade at a desired angle from the guide frame. Again, the fence is tacked to the corner of the workpiece, and the left or right frame leg of the guide frame is aligned with the longer fence bar. As the blade cuts through the workpiece 1 and the guide frame moves along the fence bar, the workpiece 1 is cut both at the selected angle, and in the selected direction.

Thus, it is an object of the invention to utilize the angular cutting guide features available in smaller, electric powered saws in conjunction with a chain saw in order to allow larger timber and beams to be more easily cut at a desired angle or in a desired direction. It is another object of the invention to provide an directing fence that ensures the uniformity of the cut, thereby allowing a semi finished cut to be accomplished with a chain saw. It is another object of the invention to provide an angle guide that allows for substantially more cutting angles than possible with prior art guides. It is yet another object of the invention to provide a light-weight, easily transportable guide that can be removed and repositioned on the chain saw, thereby not limiting the chain saw only to such uses described above.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a perspective view of the invention, particularly showing the proper positioning of a chain saw blade within an angle guide;

FIG. 2 is a cross-sectional view of the invention of FIG. 1 taken along line 2—2 of FIG. 1, particularly showing further details of the blade mounting;

FIG. 2A is a cross-sectional view of the invention of FIG. 1 taken along line 2A—2A of FIG. 2, particularly showing the way in which the chain saw blade is mounted onto the blade mount;

FIG. 3 is a perspective view of the invention, particularly showing the directing fence used to control the direction of the cut;

DETAILED DESCRIPTION OF THE PREFERRED EMBODIMENT

Figure 4:
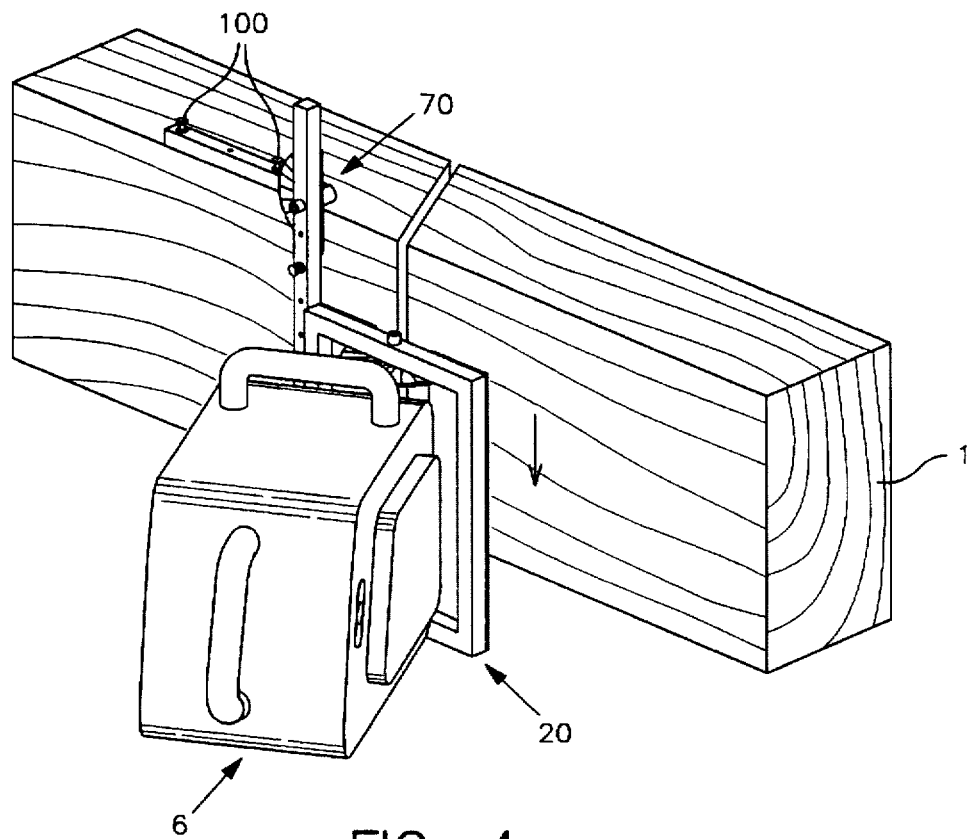
FIG. 4 is a perspective view of the invention, particularly showing the angle guide as used to control an angle of cut through a workpiece.

FIGS. 1 and 2 show an angle guide 20 for use with a chain saw 6. The angle guide 20 is designed to be removably mounted onto a blade 10 of the chain saw 6 so as to allow for greater precision in controlling an angle of a cut on a workpiece 1. The angle guide 20 can also be used in combination with a directing fence 70, which allows the direction of a cut to be controlled with precision. In combination, the angle guide 20 and directing fence 70 enable a standard chain saw 6 to shape a workpiece 1 with a wide variety of simple or compound cuts.

The angle guide 20 essentially consists of a guide frame 30 designed to rest in surface-to-surface contact with the workpiece 1 and a blade mount 50 designed to secure the angle guide 20 to the chain saw blade 10.

As illustrated in FIG. 1, the guide frame 30 has a top 35, bottom 36, left 37 and right 38 frame leg. The legs 35, 36, 37 and 38 are arranged so as to form a rigid rectangular open window structure 35A through which the chain saw blade 10 is inserted. The guide frame 30 also has an inwardly facing planar surface 32 and an opposing, outwardly facing planar surface 33.

The blade mount 50, best illustrated in FIG. 2, has an upper 51 and a lower 52 mount legs. Both legs, 51 and 52, are hingably attached to the guide frame 30 so that they extend away from inwardly facing surface 32 in a direction toward the operator of the saw 6. The upper mount leg 51 is pivotally secured to the top frame leg 35, while the lower mount leg 52 is pivotally secured to the bottom frame leg 36. An intermediate mount leg 60 interconnects the upper 51 and lower 52 mount legs forming a rigid structural relationship, the blade mount 50 thus having an approximately U-shaped structure which is able to move pivotally from side to side within the guide frame 30. Since the upper and lower mount legs, 51 and 52, are hingably attached to the guide frame 30, the intermediate mount leg 60 is free to move in an arc with respect to the guide frame 30 over an angular range of at least 160 degrees.

As illustrated in FIG. 2A, the intermediate mount leg 60 includes a mounting means 65, preferably a raised portion, on which the chain saw blade 10 is advantageously attached. The height of the mounting means 65 is selected so as to prevent the saw chain segments 10A from striking the intermediate mount leg 60. The mounting means 65 includes a planar surface 65A designed for surface-to-surface mounting contact with the saw blade 10.

Thus, to use the angle guide 20 to achieve a precise, controlled angle of cut, the blade 10 of a chain saw 6 is first inserted through the open window 35A of the guide frame 30. As seen in FIG. 1, the portion of the blade 10 nearest a motor housing 7 of the chain saw 6 is aligned with the blade mount 50 so that it is positioned vertically between the upper and lower mount legs, 51 and 52, and in approximately parallel alignment with the intermediate mount leg 60. The blade 10 is then positioned in surface-to-surface contact with the planar surface 65A of the protruding mounting means 65. Once the blade 10 is properly aligned with the mounting means 65, a mounting clamp 66, such as a flat plate, is positioned on the opposite side of the saw blade 10 and the clamp 66, blade 10 and mounting means 65 are secured together, preferably by means of one or more screws 67 preferably threaded into leg 60. Thus, the blade 10 is secured to the blade mount 50 of the angle guide 20 so that the chain saw blade 10 extends through the open window structure 35A of the guide frame 30.

Once the saw blade 10 is properly secured to the angle guide 20, the desired angle of cut may be selected simply by rotating the guide frame 30. The angle guide 20 includes an angle selecting means 67, preferably a graduated sector, which enables the user to determine the exact angle of cut that will be achieved with the selected angular position of the blade 10, within a desired degree of accuracy. As seen in FIGS. 1 and 2, the selecting means 67 is preferably located between the blade mount's upper mount leg 51 and the guide frame's top frame leg 35, so that it is easily visible by the saw user. Once the blade 10 is positioned at the desired angle, a tightening means 69 is used to secure the blade 10 and blade mount 50 in the desired position. Preferably, as illustrated, the tightening means 69 consists of a screw positioned at the center of both the top 35 and bottom 36 frame leg of the guide frame 30.

To cut the workpiece 1 at the selected angle, the saw 6 and angle guide 20 are positioned at a selected position on the workpiece 1 so that a portion of the outwardly facing surface 33 of the guide plate 30 is in contact with a surface of the workpiece 1 while saw blade 10 is either in contact with or nearly contacting the workpiece 1 at the position selected for cutting. The guide frame 30 is kept firmly against the workpiece 1 as the blade 10 cuts through the workpiece, thus cutting it at the desired angle, as demonstrated in FIG. 4.

Figure 5:
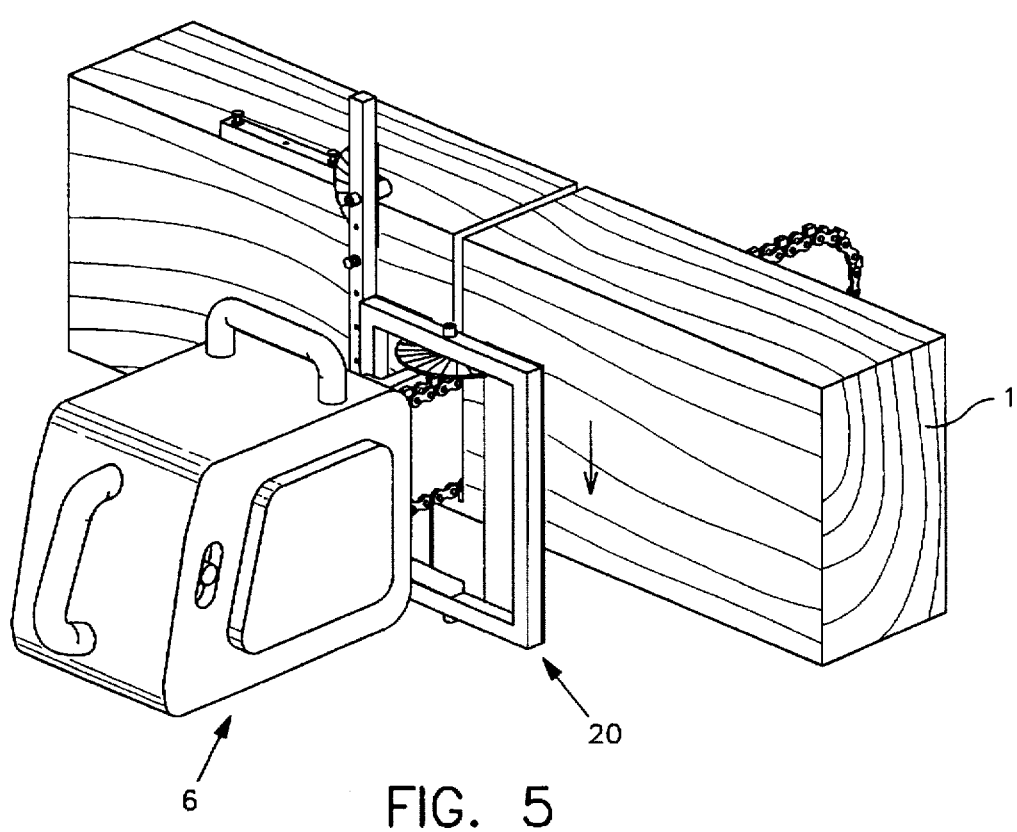
FIG. 5 is a perspective view of the invention, particularly showing the angle guide used in conjunction with the directing fence to achieve a smooth cut through the workpiece at the desired angle.

The angle guide 20 may also be used in combination with a directing fence 70 which helps to maintain a uniformly straight cut across the workpiece at the desired angle, as shown in FIG. 5. When used alone, the angle guide 20 is only capable of controlling the angle of cut, however, when used in conjunction with the directing fence 70, a direction of cut may also be controlled and maintained through the workpiece 1 so that the cut surface of the workpiece 1 is generally smooth.

As seen in FIG. 3, the directing fence 70 provides a first 74 and a second elongate, rigid, fence bar 84. The length of the bars 74 and 84 may be made to any desired fixed length. The first bar 74 is preferably longer than the second bar 84. The bars 74 and 84 are pivotally mounted to one another so that the first bar 74 is rotatable about the second bar 84. The directing fence 70 includes a selecting means 71, preferably a second graduated sector. The selecting means 71 indicates the angle between the bars 74 and 84 within a desired degree of accuracy. When the bars 74 and 84 are positioned at the desired angle, a tightening means 79, such as an integral screw, is used to secure them in the selected position and one or more nails 100 are used to secure the fence 70 against the workpiece 1.

The bars 74 and 84 have a square or rectangular shape that provide elongate, flat side surfaces. In a vertically oriented position, as shown in FIG. 3, the first bar 74 has a front 75, rear 76, left 77 and right 78 elongate side surface and the second bar 84 has a top 85, bottom 86, front 87 and rear 88 elongate side surfaces. A series of through holes 80 are arranged in a linear alignment along each of the bars, 74 and 84, so as to allow the fence 70 to be easily secured to a workpiece 1 in any orientation. The holes 80 extend as clearance holes through the bars, thus providing means by which to nail the fence against the workpiece 1.

Figure 6:
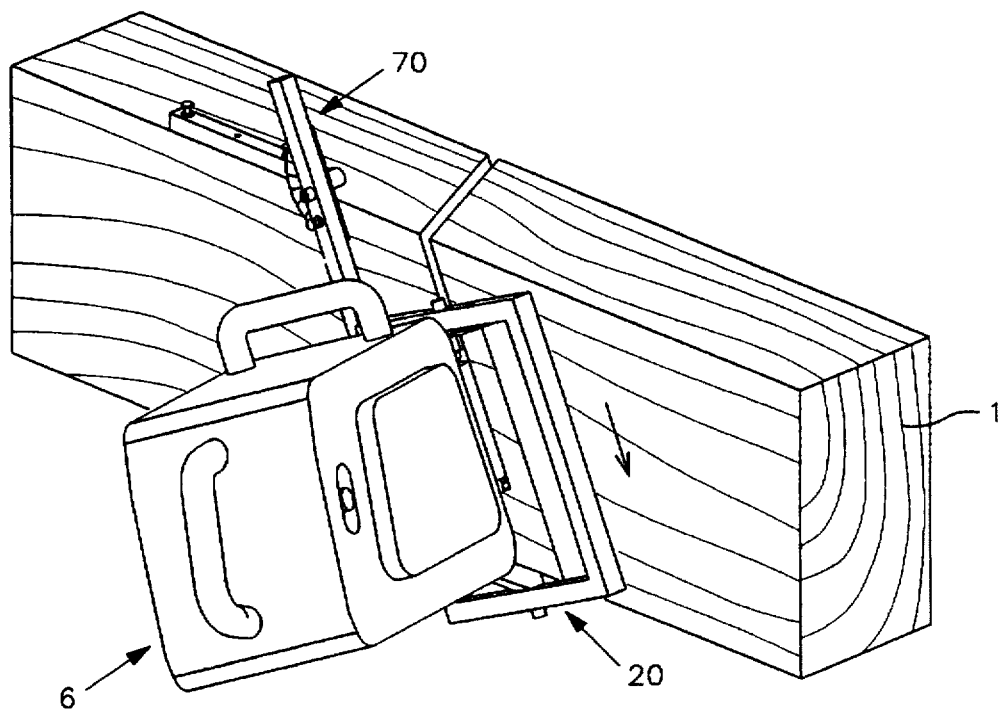
FIG. 6 is a perspective view of the invention, particularly showing the angle guide used in conjunction with the directing fence to control the direction of cut through the workpiece.

Thus, to cut a workpiece 1 in a particular direction, as illustrated in FIG. 6, the bars 74 and 84 are rotated so that the angle between them correlates with the desired direction of the cut. The tightening means 79 is then used to secure the bars 74 and 84 in the selected angular position. As illustrated, the fence 70 is aligned with the corner of the workpiece 1 so that the bottom surface 86 of the second bar 84 rests against a first edge of the workpiece, while the rear surface 76 of the first bar 74 rests against a second edge of the workpiece 1 at the selected angle. The fence 70 can then be temporarily secured to the workpiece 1 simply by lightly tacking one or more nails 100 through the bars' through holes 80 and into the workpiece 1.

The saw blade 10 is secured to the angle guide 20 as described above, and the blade 10 is secured in the perpendicular, or 90 degree position with respect to the guide frame 30. The angle guide 20 is then positioned so that the outfacing surface 33 of the guide frame 30 is in contact with the second edge of the workpiece 1 and either the left 37 or right 38 frame leg is aligned with the right elongate surface 78 of the first fence bar 74. In this position the horizontal edge of the attached chain saw blade 10 contacts the workpiece. As the blade 10 begins to cut through the workpiece 1 the frame leg 37 or 38 is kept in sliding contact with the right side surface 78 of the fence 70, thus guiding the angle guide 20, and hence the saw blade 10, along the directing fence 70 in the desired direction.

Alternately, the directing fence 70 can be used simply to ensure that a smooth, uniform angled cut is achieved with angle guide 20. To accomplish this, as illustrated in FIG. 5, the blade mount 50 and saw blade 10 are secured at the desired angle, while the fence bars 74 and 84 are secured in the perpendicular, 90 degree position and attached to the workpiece 1. The left 37 or right 38 frame leg of the angle guide 20 is aligned with the first fence bar 74 and kept in sliding contact with it as the blade 10 cuts through the workpiece 1 at the desired angle.

Figure 7:
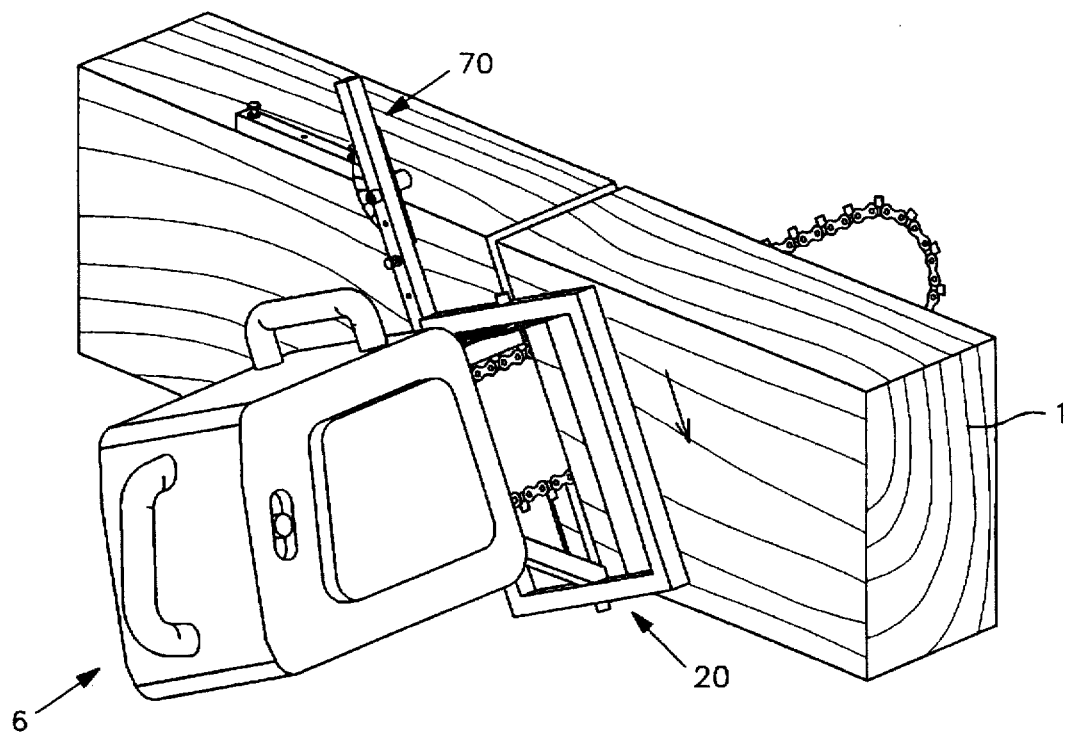
FIG. 7 is a perspective view of the invention, particularly showing the angle guide used in conjunction with the directing fence to create a compound cut through the workpiece at both the desired angle and direction.

Still further, the combination angle guide 20 and directing fence 70 can be used to create numerous compound cuts in which both the angle and the direction of the cut is controlled. To produce such cuts, the same procedure is followed as described above. However, in this case both the angle guide 20 and directing fence 70 are tightened at selected angles, as illustrated in FIG. 7.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. An angle guide for use with a chain saw in controlling an angle of cut in a workpiece, the guide comprising:

a guide frame having a left frame leg, a right frame leg, a top frame leg, and a bottom frame leg arranged as respective sides of a rigid open window structure, the guide frame providing an outwardly facing planar surface for orienting the chain saw against a workpiece and for stabilizing the chain saw in a desired direction of motion through the workpiece;

a blade mount having upper and lower mount legs hingably interconnected to the top and bottom frame legs respectively and further having an intermediate mount leg positioned between the upper and lower mount legs and joining the upper and lower mount legs in a rigid structural relationship such that the intermediate mount leg is free to move in an arc, of at least 160 angular degrees, symmetrically with respect to the guide frame, the intermediate mount leg further including a means for mounting to a chain saw blade so that the blade protrudes through the open window structure, rotatable with the blade mount;

means for tightening the blade mount on the guide frame in a selected angular position, within the arc, for cutting at the selected angular position in the workpiece.

2. The angle guide of claim 1 further including a means for selecting the specified angle of cut to within a desired degree of accuracy.

3. The angle guide of claim 2 wherein the selecting means is a first graduated sector.

4. A combination angle guide and directing fence for use with a chain saw in controlling an angle of cut and separately, a direction of cut comprising:

the angle guide providing a guide frame having a left frame leg, a right frame leg, a top frame leg, and a bottom frame leg arranged as respective sides of a rigid open window structure, the guide frame providing an outwardly facing planar surface for orienting the chain saw against a workpiece and for stabilizing the chain saw in a desired direction of motion through the workpiece;

the angle guide further providing a chain saw blade mount having upper and lower mount legs hingably interconnected to the top and bottom frame legs respectively and further having an intermediate mount leg positioned between the upper and lower mount legs and joining the upper and lower mount legs in a rigid structural relationship such that the intermediate mount leg is free to move in an arc, of at least 160 angular degrees, symmetrically with respect to the guide frame, the intermediate mount leg further including a means for mounting to a chain saw blade so that the blade protrudes through the open window structure; and means for tightening the blade mount on the guide frame in a selected angular position, within the arc, for cutting at the selected angular position in the workpiece, and the directing fence providing a first and a second elongate, rigid, fence bars, each of the bars providing a flat elongate surface capable of sliding contact with the left and right frame legs in guiding the angle guide along the directing fence, and a series of through holes arranged in a linear array, the holes extending through the bars in a direction parallel to the elongate surface, the first of the bars being pivotally mounted to the second of the bars such that the first of the bars is rotatable about the second of the bars so that the angle between the elongate surfaces is adjustable over a range of angles.

5. The combination of claim 4 further including a means for selecting the specified angle of cut to within a desired degree of accuracy.

6. The combination of claim 5 wherein the selecting means is a first graduated sector.

7. The combination of claim 5 wherein the selecting means is a graduated sector.

8. The combination of claim 4 further including a means for selecting the specified angle between the bars to within a desired degree of accuracy.

9. The combination of claim 4 further including a means for selecting the specified direction of cut to within a desired degree of accuracy.

\* \* \* \* \*